A. G. FRAGNER.
END CHUTE.
APPLICATION FILED SEPT. 19, 1919.
1,354,817.
Patented Oct. 5, 1920.
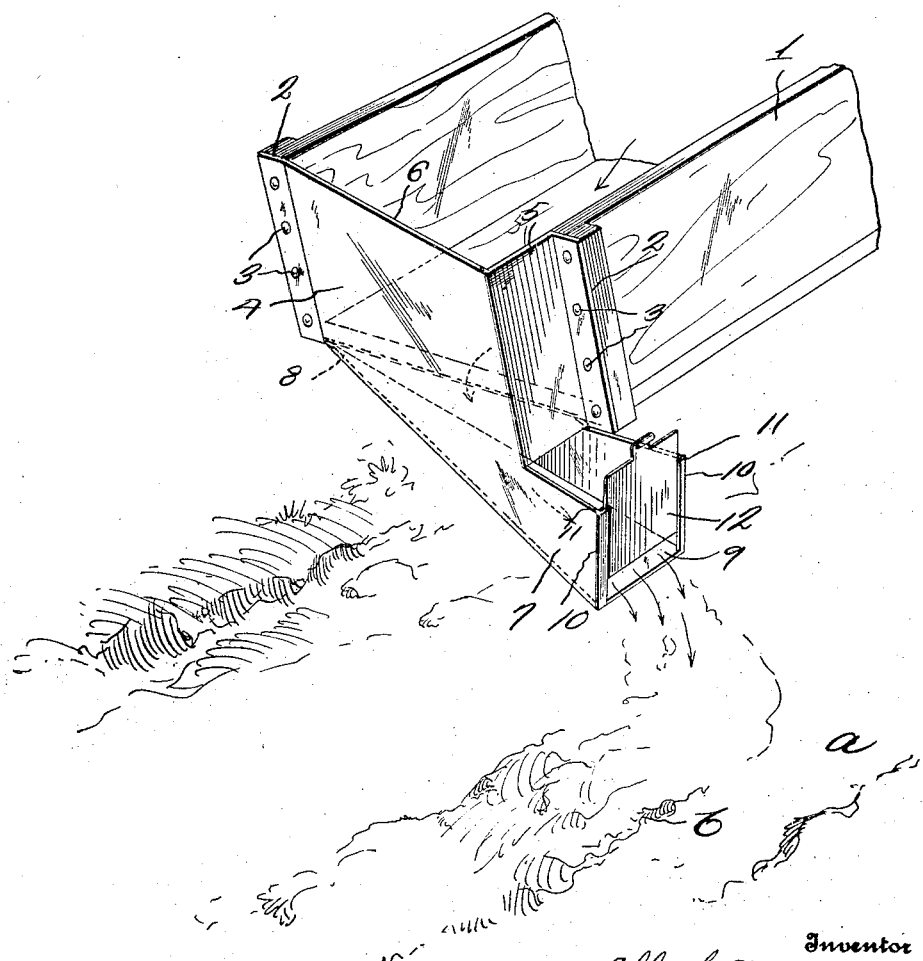
Inventor
Albert G. Fragner:
by D. Swift
    his Attorney

UNITED STATES PATENT OFFICE.

ALBERT G. FRAGNER, OF MONROE, MICHIGAN.

END CHUTE.

1,354,817.     Specification of Letters Patent.     Patented Oct. 5, 1920.

Application filed September 19, 1919. Serial No. 324,937.

*To all whom it may concern:*

Be it known that I, ALBERT G. FRAGNER, a citizen of the United States, residing at Monroe, in the county of Monroe, State of Michigan, have invented a new and useful End Chute; and I do hereby declare the following to be a full, clear, and exact description of the invention, such as will enable others skilled in the art to which it appertains to make and use the same.

The invention relates to end gates for wagon or truck bodies and has for its object to provide an end gate of this character, as the wagon or truck body is tilted for dumping, the material within the wagon or truck will slide rearwardly against an inclined wall and be discharged to the side of a road by a transversely disposed inclined chute. Therefore a further object is to provide a dumping chute for a wagon or truck, which will obviate the necessity of turning the truck or wagon around when it is desired to dump along the edge of a road.

A further object is to provide a chute for a dump truck or wagon wherein material will be deposited along the edge of a road as the wagon or truck advances, thereby providing a wagon or truck and chute which is particularly adapted for road construction and repair.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

The single figure in the drawing represents the rear end of a vehicle dump body, showing the same inclined, said body being designated by the numeral 1. Secured to the rear vertical sides 2 of the sides of the body 1, by means of rivets or the like 3 is a triangular shaped member 4. The right angle portion 5 of the tri-angular shaped member 4 maintaining the body of said member 4 at an angle to the ends of the body 1, thereby forming an inclined wall 6. The triangular shaped member has depending and formed integral therewith a pyramidal shaped chute 7, having its apex end 8 adjacent one side of the rear of the truck or wagon body, while its base 9 is open and is disposed to one side of the truck or wagon body thereby forming a discharge opening through which the dirt may be discharged to one side of the road *a* as indicated at *b*. The sides 10 of the pyramidal chute 7 are provided with guides 11 in which guides a closure member 12 is adapted to slide, said slide being normally closed but during a dumping operation the slide may be opened so that as the truck or wagon advances with the dump body in inclined position, the slide may be raised thereby allowing the material within the truck or wagon body to slide rearwardly against the inclined wall 6 and into the chute 7. The chute 7 being inclined the material will slide transversely in relation to the truck or wagon body and through the opening 9 and be deposited on the road bed as shown at *b*.

The invention having been set forth what is claimed as new and useful is:—

1. A discharge chute for dump wagons or trucks comprising a right angle member, said member having one of its sections secured to one side of the dump body, and extending transversely at an obtuse angle, the other member of said angled member being secured to the other side of the dump body and in substantially the same angle as said side, and a pyramidal shaped chute carried by the angled member and extending transversely and having its apex disposed at one side of the dump body and below the bottom thereof and its base disposed to one side of the dump body at the opposite side to its apex end.

2. A discharge chute for dump wagons or trucks comprising an angled member having one of its walls at an obtuse angle to the sides of the body of the wagon or truck, its other wall at the same angle as one of the sides of the dump body, and a transversely disposed pyramidal shaped side discharge chute carried by the angled member, the apex of said pyramidal shaped chute being disposed at one side of the lower discharge edge of the dump body and its base discharge opening disposed to the outside and to one side of the dump body as a whole.

In testimony whereof I have signed my name to this specification in the presence of two subscribing witnesses.

ALBERT G. FRAGNER.

Witnesses:
WALTER H. FRAGNER,
FRED W. STONER.